(12) United States Patent
Taron et al.

(10) Patent No.: US 11,256,682 B2
(45) Date of Patent: *Feb. 22, 2022

(54) MANAGING STORAGE QUOTAS IN A SHARED STORAGE SYSTEM

(71) Applicant: Qumulo, Inc., Seattle, WA (US)

(72) Inventors: Philip Taron, Seattle, WA (US);
Patrick Jakubowski, Seattle, WA (US);
Remi Bernotavicius, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,277

(22) Filed: Oct. 4, 2018

(65) Prior Publication Data

US 2019/0243818 A1    Aug. 8, 2019

Related U.S. Application Data

(63) Continuation of application No. 15/474,047, filed on Mar. 30, 2017, now Pat. No. 10,095,729.
(Continued)

(51) Int. Cl.
*G06F 16/23* (2019.01)
*G06F 16/13* (2019.01)
(Continued)

(52) U.S. Cl.
CPC .......... *G06F 16/2365* (2019.01); *G06F 16/13* (2019.01); *G06F 16/176* (2019.01); *G06F 16/1727* (2019.01)

(58) Field of Classification Search
CPC ............. G06F 16/2365; G06F 16/1727; G06F 16/176; G06F 16/13
See application file for complete search history.

(56) References Cited

U.S. PATENT DOCUMENTS 5,165,031 A    11/1992 Pruul et al.
5,319,773 A     6/1994 Britton et al.
(Continued)

FOREIGN PATENT DOCUMENTS

EP    1217551 A2    6/2002
EP    1498829 A1    1/2005
(Continued)

OTHER PUBLICATIONS

Official Communication for U.S. Appl. No. 15/474,047 dated Mar. 9, 2018, pp. 1-8.
(Continued)

*Primary Examiner* — Alicia M Willoughby
(74) *Attorney, Agent, or Firm* — John W. Branch; Branch Partners PLLC

(57) ABSTRACT

A facility for managing filesystem object storage quotas (i.e., size limits) in a storage environment is disclosed. The facility enables users to establish, modify, and remove quotas on directories and files within a filesystem. Each quota acts as a soft limit on the size of the associated filesystem object, including any child objects of the filesystem object. The facility improves the speed at which the system can test for and identify violations of quotas established for individual filesystem objects by using aggregation and reconciliation techniques rather than constantly traversing a filesystem in its entirety to test for violations of quotas.

20 Claims, 7 Drawing Sheets

Related U.S. Application Data

(60) Provisional application No. 62/446,261, filed on Jan. 13, 2017, provisional application No. 62/432,554, filed on Dec. 9, 2016.

(51) Int. Cl.
*G06F 16/176* (2019.01)
*G06F 16/17* (2019.01)

(56) References Cited

U.S. PATENT DOCUMENTS

| | | |
|---|---|---|
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,213,040 B1 | 5/2007 | Stokes et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1* | 10/2011 | Zhuge ................ G06F 16/122 707/783 |
| 8,108,429 B2 | 1/2012 | Sim-Tang et al. |
| 8,296,312 B1 | 10/2012 | Leung et al. |
| 8,355,407 B2 | 1/2013 | Wookey et al. |
| 8,364,648 B1 | 1/2013 | Sim-Tang |
| 8,423,733 B1* | 4/2013 | Ozdemir ............... G06F 3/0604 711/162 |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,776,050 B2 | 7/2014 | Plouffe et al. |
| 8,782,655 B2 | 7/2014 | Blanding |
| 8,806,154 B1 | 8/2014 | Gupta |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1* | 12/2014 | Zhong ..................... G06F 16/13 707/690 |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash |
| 9,244,975 B2 | 1/2016 | Das et al. |
| 9,244,976 B1 | 1/2016 | Zhang et al. |
| 9,384,252 B2 | 7/2016 | Akirav et al. |
| 9,501,487 B1 | 11/2016 | Yuan et al. |
| 9,547,560 B1 | 1/2017 | Lee |
| 9,600,193 B2 | 3/2017 | Ahrens |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1* | 11/2018 | Lopez ................... G06F 16/125 |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds |
| 10,339,101 B1 | 7/2019 | Gupta |
| 10,423,609 B1 | 9/2019 | Strauss |
| 10,437,509 B1 | 10/2019 | Alexeev |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,678,663 B1 | 6/2020 | Sharma et al. |
| 10,725,977 B1 | 7/2020 | Chmiel et al. |
| 2001/0039622 A1 | 11/2001 | Hitz et al. |
| 2002/0065835 A1* | 5/2002 | Fujisaki ................ G06F 16/122 |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1* | 7/2005 | Steely ..................... G06F 9/383 712/228 |
| 2005/0195660 A1 | 9/2005 | Kavuri et al. |
| 2005/0223019 A1 | 10/2005 | Das |
| 2006/0004890 A1 | 1/2006 | Semple et al. |
| 2006/0053139 A1 | 3/2006 | Marzinski |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1* | 12/2008 | McWilliams ....... G06F 12/0284 709/214 |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2010/0030825 A1 | 2/2010 | Matsuzawa et al. |

(56) References Cited

U.S. PATENT DOCUMENTS

| | | |
|---|---|---|
| 2010/0036895 A1* | 2/2010 | Boyd .................. G06F 16/1873 707/E17.007 |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1* | 6/2011 | Wang .................. G06F 16/122 707/814 |
| 2011/0161964 A1 | 6/2011 | Piazza et al. |
| 2011/0196833 A1* | 8/2011 | Drobychev ............ G06F 16/23 707/634 |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1* | 3/2012 | Saika ...................... G06F 3/061 707/634 |
| 2012/0096059 A1* | 4/2012 | Shimizu .................. G06F 3/061 707/828 |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0204060 A1 | 8/2012 | Swift et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1* | 4/2013 | Preslan .................. G06F 16/13 707/797 |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1* | 8/2013 | Flynn ...................... G11C 16/26 711/165 |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0149736 A1 | 5/2015 | Kwon et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234879 A1* | 8/2015 | Baldwin .............. G06F 16/1727 707/694 |
| 2015/0242263 A1 | 8/2015 | Klose |
| 2015/0278282 A1 | 10/2015 | Sardina et al. |
| 2015/0310035 A1* | 10/2015 | Godman ................ G06F 16/185 707/751 |
| 2015/0347126 A1 | 12/2015 | Tibble et al. |
| 2016/0034356 A1 | 2/2016 | Aron et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0246816 A1 | 8/2016 | Abiri et al. |
| 2016/0292013 A1 | 10/2016 | Li et al. |
| 2016/0306810 A1 | 10/2016 | Ni |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0123883 A1 | 5/2017 | Hail |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0101546 A1* | 4/2018 | Krasnow .............. G06F 16/1734 |
| 2018/0129443 A1 | 5/2018 | Karve et al. |
| 2018/0288057 A1 | 10/2018 | Varadamma |
| 2018/0314423 A1 | 11/2018 | Gong et al. |
| 2018/0365115 A1 | 12/2018 | Fang et al. |
| 2019/0095112 A1 | 3/2019 | Lingarajappa |
| 2019/0102700 A1 | 4/2019 | Babu et al. |
| 2019/0163591 A1 | 5/2019 | Ouyang et al. |
| 2019/0196879 A1 | 6/2019 | Dutta et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0174692 A1 | 6/2020 | Dave et al. |
| 2021/0042263 A1 | 2/2021 | Zdornov et al. |
| 2021/0042282 A1 | 2/2021 | Cseri et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Official Communication for U.S. Appl. No. 15/474,047 dated Sep. 18, 2017, pp. 1-14.

Official Communication for U.S. Appl. No. 15/474,047 dated Aug. 15, 2018, pp. 1-11.

Office Communication for U.S. Appl. No. 14/859,114 dated Jun. 5, 2020, pp. 1-6.

Office Communication for U.S. Appl. No. 16/262,756 dated Jun. 8, 2020, pp. 1-43.

Office Communication for U.S. Appl. No. 14/595,598 dated Jul. 9, 2020, pp. 1-26.

Office Communication for U.S. Appl. No. 16/752,451 dated Jul. 23, 2020, pp. 1-31.

(56) References Cited

OTHER PUBLICATIONS

Office Communication for U.S. Appl. No. 14/859,114 dated Jul. 23, 2020, pp. 1-28.
Office Communication for U.S. Appl. No. 16/152,615 mailed Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/775,041 dated Aug. 18, 2020, pp. 1-17.
Office Communication for U.S. Appl. No. 16/883,879 dated Sep. 1, 2020, pp. 1-18.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2016/38242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-21.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/262,756 dated Aug. 5, 2019, pp. 1-48.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 15/473,051 dated Jun. 30, 2017, pp. 1-22.
European Search Report for European Application 18155779.4 dated Apr. 17, 2018, pp. 1-15.
Office Communication for U.S. Appl. No. 16/004,182 dated Aug. 23, 2018, pp. 1-46.
Office Communication for U.S. Appl. No. 16/004,182 dated Mar. 5, 2019, pp. 1-46.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.
Office Communication for U.S. Appl. No. 14/595,043 dated May 4, 2017, pp. 1-38.
Office Communication for U.S. Appl. No. 14/595,043 dated Feb. 23, 2018, pp. 1-22.
Office Communication for U.S. Appl. No. 14/595,043 dated May 25, 2018, pp. 1-14.
Office Communication for U.S. Appl. No. 14/595,043 dated Oct. 5, 2018, pp. 1-26.
Office Communication for U.S. Appl. No. 14/595,043 dated Jun. 7, 2019, pp. 1-29.
Office Communication for U.S. Appl. No. 14/595,043 dated Aug. 27, 2019, pp. 1-34.
Office Communication for U.S. Appl. No. 14/658,015 dated Apr. 27, 2017, pp. 1-8.
Office Communication for U.S. Appl. No. 14/658,015 dated Jan. 4, 2018, pp. 1-35.
Office Communication for U.S. Appl. No. 14/658,015 dated Jul. 13, 2018, pp. 1-18.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 14/859,114 dated Jul. 24, 2017, pp. 1-165.
Office Communication for U.S. Appl. No. 14/859,114 dated Feb. 21, 2018, pp. 1-27.
Office Communication for U.S. Appl. No. 14/859,114 dated May 11, 2018, pp. 1-7.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 16/234,334 dated Oct. 11, 2019, pp. 1-22.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/474,047 dated Jun. 11, 2018, pp. 1-7.
Office Communication for U.S. Appl. No. 16/234,395 dated Mar. 28, 2019, pp. 1-36.

(56) References Cited

OTHER PUBLICATIONS

Kappes et al. "Dike: Virtualization-aware Access Control for Multitenant Filesystems", Feb. 18, 2013, pp. 1-6.
Office Communication for U.S. Appl. No. 15/957,809 dated Jan. 24, 2019, pp. 1-24.
Office Communication for U.S. Appl. No. 15/957,809 dated Jun. 28, 2018, pp. 1-42.
Office Communication for U.S. Appl. No. 16/152,259 dated Apr. 29, 2020, pp. 1-19.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Application 17206518.7 dated Apr. 5, 2018, pp. 1-8.
Karatza et al. Epoch load sharing in a network of workstations, Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Extended European Search Report for European Application 18155779.4 dated Apr. 17, 2018, pp. 1-15.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/228,716 dated Jun. 24, 2019, pp. 1-28.
Office Communication for U.S. Appl. No. 16/226,587 dated Aug. 5, 2019, pp. 1-54.
Office Communication for U.S. Appl. No. 16/231,354 dated Jul. 10, 2019, pp. 1-16.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 16/228,716 dated Feb. 28, 2019, pp. 1-28.
Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/004,182 dated Mar. 23, 2020, pp. 1-6.
Office Communication for U.S. Appl. No. 15/694,604 dated Nov. 20, 2019, pp. 1-24.
Office Communication for U.S. Appl. No. 16/004,182 dated Apr. 28, 2020, pp. 1-52.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/004,598 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.

(56) References Cited

OTHER PUBLICATIONS

Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/004,182 dated Sep. 10. 2021, pp. 1-4.
Office Communication for U.S. Appl. No. 16/004,182 dated Sep. 29, 2021, pp. 1-11.

* cited by examiner

MANAGING STORAGE QUOTAS IN A SHARED STORAGE SYSTEM

CROSS-REFERENCE TO RELATED APPLICATIONS

This Utility Patent Application is a Continuation of U.S. patent application Ser. No. 15/474,047 entitled "MANAGING STORAGE QUOTAS IN A SHARED STORAGE SYSTEM," filed on Mar. 30, 2017, now U.S. Pat. No. 10,095,729 issued on Oct. 9, 2018, which is based on previously filed U.S. Provisional Application No. 62/432,554 entitled "MANAGING STORAGE QUOTAS IN A SHARED STORAGE SYSTEM," filed on Dec. 9, 2016 and claims the benefit of U.S. Provisional Application No. 62/446,261 entitled "MANAGING STORAGE QUOTAS IN A SHARED STORAGE SYSTEM," filed on Jan. 13, 2017, the benefit of the filing dates of which are claimed under 35 U.S.C § 120 and § 119(e), and the contents of which are each further incorporated in entirety by reference. This application is related to U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional Application Ser. No. 14/595,043 entitled "FILESYSTEM HIERARCHICAL AGGREGATE METRICS," filed on Jan. 12, 2015; U.S. Non-Provisional Application Ser. No. 14/595,598 entitled "FAIR SAMPLING IN A HIERARCHICAL FILESYSTEM," filed on Jan. 13, 2015; U.S. Non-Provisional Application Ser. No. 14/658,015 entitled "DATA MOBILITY, ACCESSIBILITY, AND CONSISTENCY IN A DATA STORAGE SYSTEM," filed on Mar. 13, 2015; and U.S. Non-Provisional Application Ser. No. 14/859,114, entitled FILESYSTEM HIERARCHICAL CAPACITY QUANTITY AND AGGREGATE METRICS, filed on Sep. 18, 2015, each of the above-mentioned applications is herein incorporated by reference in its entirety. In cases where the present application and a document incorporated herein by reference conflict, the present application controls.

TECHNICAL FIELD

The described technology is directed to the field of filesystems.

BACKGROUND

Enterprise filesystems can store large volumes of data on behalf of large numbers of users. These filesystems can have thousands of accounts, each account storing any amount of data. Enterprises, businesses, and individuals alike now use large scale filesystems to store data that is remotely accessible via a network, such as a cloud based storage environment. Such filesystems are often accessible via closed (e.g., enterprise) and open (e.g., Internet) networks and allow concurrent access via multiple client devices. Furthermore, the amount of data stored for a particular account may grow or shrink without notice.

DETAILED DESCRIPTION

Figure 1:
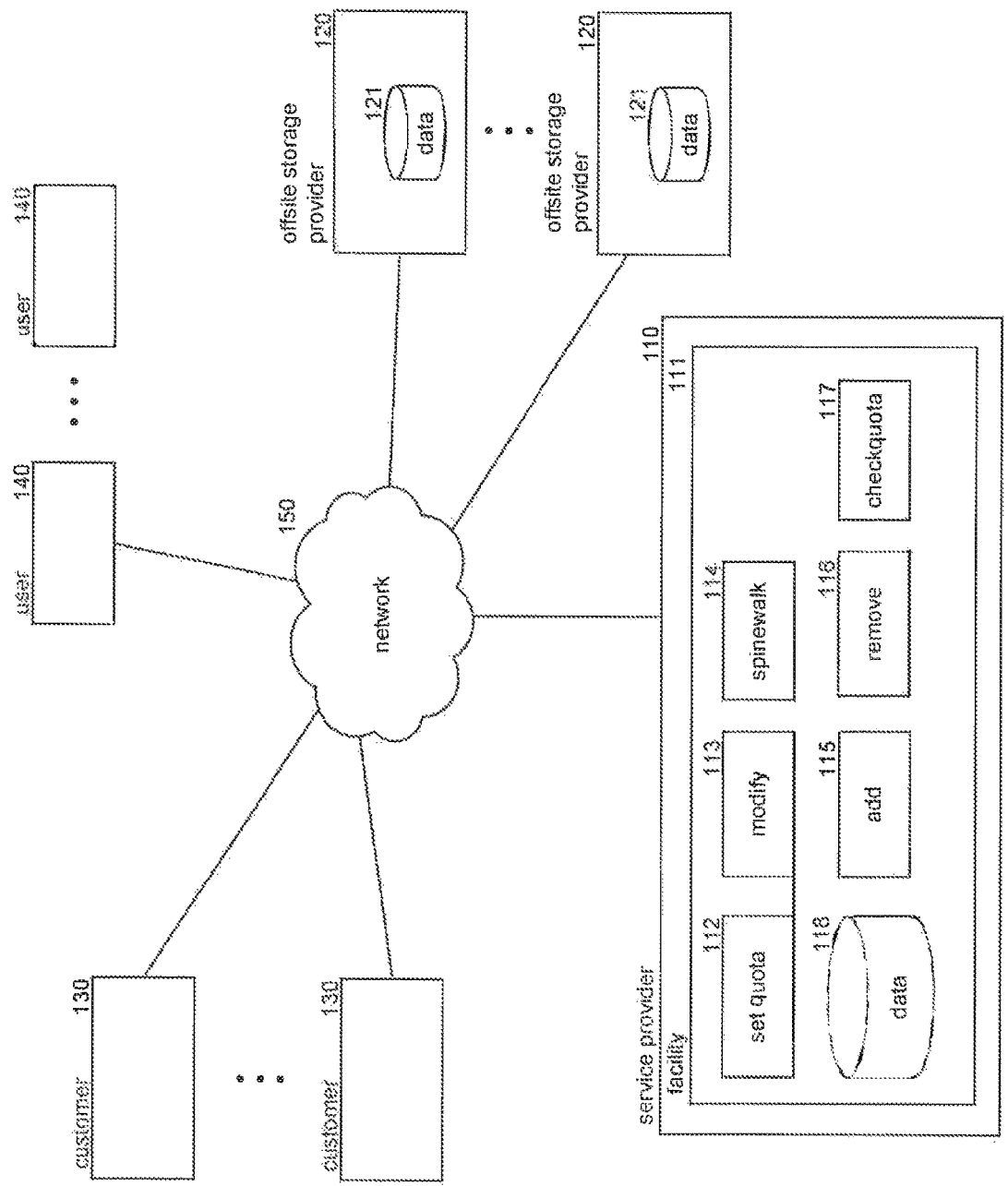
FIG. 1 is a block diagram illustrating an environment in which the facility may operate.

Users, such as account administrators, account holders, and/or storage system managers, benefit from being able to limit the amount of storage that consumers can use at any one time. For example, if a system administrator has allotted 10 GB of storage space in a shared file system with a capacity of 1000 GB to each of 100 users (i.e., a 10 GB quota per user), the system administrator may benefit from preventing each user from going over their allotted 10 GB. In this manner, the system administrator can ensure that each user has access to the amount of storage space that has been allotted to them and that one or more users are not unfairly or inappropriately taking up more than their fair share of storage space. As another example, even if the system administrator is not concerned with individual users surpassing 10 GB of storage usage, the system administrator may benefit from preventing the group of 100 users, as a whole, from going over the 1000 GB capacity of the shared file system. In this manner, the system administrator can ensure that the group does not violate any system wide restrictions on usage of storage space, such as a system wide 1000 GB quota, which may, for example, result in higher costs, degradation of service, and so on. The demand for scalable storage resources and the ability to provide rapid access to content stored thereby is a key concern to end-users. Furthermore, the ability to impose limits or quotas on the usage of this storage space is a concern to filesystem users, managers, and providers.

A facility for managing filesystem object storage quotas (i.e., size limits) in a storage environment is disclosed. The facility enables users to establish, modify, and remove quotas on directories and files within a filesystem. In the disclosed facility, each quota acts as a soft limit on the size of the associated filesystem object, including any child objects of the filesystem object. For example, a quota on a directory acts as a limit on the size of the contents of that directory and all of its subdirectories. The facility leverages the aggregation techniques described in, for example, U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional Application Ser. No. 14/595,043 entitled "FILESYSTEM HIERARCHICAL AGGREGATE METRICS," filed on Jan. 12, 2015, and U.S. Non-Provisional Application Ser. No. 14/859,114, entitled FILESYSTEM HIERARCHICAL CAPACITY QUANTITY AND AGGREGATE METRICS, filed on Sep. 18, 2015, each of which is herein incorporated by reference in its entirety, to provide improved techniques for managing quotas within a filesystem. For example, because the disclosed filesystem itself maintains aggregate values such as size for individual directories, the facility can manage and enforce quotas without having to traverse an entire file structure every time a change is made in the filesystem. In this manner, the facility improves the speed at which the system can test for and identify violations of quotas established for individual filesystem objects—such as directories and files—and reduces the processing resources need to do so.

In some embodiments, the facility maintains each quota enforcement status using an enforcement (or enforcing) bit. Furthermore, because a filesystem object without its own quota can be subject to the quota of an ancestor filesystem object (e.g., a parent directory), an enforcement bit can bet set for any filesystem object that is directly or indirectly subject to a quota. Thus, if a directory that has a quota is currently violating its quota, every descendent of the violating directory can be marked to indicate that it is subject to a quota that is currently being enforced. In this manner, the enforcement bit for a filesystem object indicates whether the filesystem (or any of its ancestors) is currently in violation of its associated quota. In some embodiments, the enforcement bit is stored in metadata or an inode associated with the corresponding filesystem object. When the enforcement bit for a quota is set (e.g., equal to true or '1'), the facility is enforcing an associated quota and, therefore, the facility will deny any requests to increase the size of any file and/or directory that impacted by the quota. For example, the facility will prevent attempts to 1) add metadata to an "enforcing" file or directory, 2) create new directories or files within an "enforcing" directory, 3) hard link files to an "enforcing" directory, 4) write additional information to a file within an "enforcing" directory, and so on. The facility can, however, allow modifications that do not increase the size of the data subject to the quota, such as writes that decrease the size of a file or directory and/or writes that do not change the size of a file or directory. When the enforcement bit is not set (e.g., equal to false or '0'), the facility is not enforcing any associated quota and, therefore, the corresponding filesystem object is not subject to any quota that is currently being violated and, therefore, the facility will allow requests to increase the size of any file and/or directory that effects the quota.

In some embodiments, the facility uses a system "epoch" counter to manage quotas. Each system epoch represents a period of time in which the facility can determine that the enforcement status of any file or directory within the quota system has not changed. Thus, when an operation occurs that will cause a non-enforcing filesystem object to surpass its quota, the facility, among other things, increments the system epoch counter to establish a new system epoch. Similarly, when an operation occurs that will cause an enforcing filesystem object to drop below its quota, the facility, among other things, increments the system epoch counter to establish a new system epoch. When a requested modification to a filesystem object that is not enforcing causes the filesystem object to surpass its quota, the facility allows the modification but registers a "quota event." Similarly, when a requested modification to a filesystem object that is enforcing causes the filesystem object to go under its quota, the facility allows also registers a "quota event". The facility registers these "quota events" by incrementing the system "epoch" counter. In addition to events that cause a filesystem object to go over or under its quota, in some embodiments the facility increments the system epoch counter in response to other events, such as any changes to a quota, including creating a quota, updating a quota, deleting a quota, increasing a quota, decreasing a quota, and so on; moving a directory from one directory to another directory (so that it has a new parent directory), etc.

In addition to the system epoch, in some embodiments the facility maintains, for each filesystem object subject to a quota, an indication of an epoch during which the enforcement status of the filesystem object was last determined to have changed. For example, if the size of an enforcing directory drops below its quota during "epoch 2," the facility stores an indication of "epoch 2" in association with the directory (e.g., in an inode or other metadata associated with the directory) and increments the current epoch to 3. Maintaining epoch values for individual filesystem objects enables the facility to determine whether enforcement bits for individual quotas can be trusted. Accordingly, the facility can maintain quotas for individual filesystem objects without needing to traverse the entire filesystem to determine whether any filesystem objects are in violation of the quota, thereby providing a substantial improvement over conventional quota management systems.

In some embodiments, during aggregate reconciliation, the filesystem updates filesystem object epoch information based on the current state of the filesystem object during reconciliation. For example, if, during reconciliation, the facility determines that the aggregate size of a filesystem object is larger than its quota and the filesystem object is not enforcing, the facility can adjust system and object epoch values accordingly. Aggregate reconciliation is further discussed in, for example, U.S. Non-Provisional Application Ser. No. 14/595,043 entitled "FILESYSTEM HIERARCHICAL AGGREGATE METRICS," filed on Jan. 12, 2015 and U.S. Non-Provisional Application Ser. No. 14/859,114, entitled FILESYSTEM HIERARCHICAL CAPACITY QUANTITY AND AGGREGATE METRICS, filed on Sep. 18, 2015, each of which is herein incorporated by reference in its entirety.

The epoch information enables the facility to quickly and easily determine whether quota enforcement information associated with a particular filesystem object is up to date. This is especially useful when adding information to the filesystem. If the filesystem receives a request to add information to a filesystem object that is not enforcing, the facility can allow the operation unless the epoch associated with the filesystem object (i.e., the most recent epoch during which the enforcement bit was changed for the filesystem object) is different from the current epoch. This is because if these two values are the same, the facility can trust that no filesystem object has changed its associated quota enforcement status at least since the filesystem object to be modified was last updated.

For example, if none of the filesystem objects in the system are enforcing and a requested write to a file with the path/usr1/dir1/file1 and a size of 100 GB during epoch "3" would put either the/usr1 directory or the/usr1/dir1 directory over its quota, then the filesystem would (1) allow the write, (2) set the enforcing bit of each of the directories that are now in violation of its quota, (3) set the epoch of the directory or directories that are now in violation of the quota to "3"—the current epoch—, and (4) increment the system epoch counter to "4." Similarly, if the/usr1 directory and the/usr1/dir1 directories were enforcing (i.e., had their enforcement bits set) and a requested write to a file with the path/usr1/dir1/file1 during epoch "20" would put either the/usr1 directory or the/usr1/dir1 directory under its quota, then the filesystem would (1) allow the write, (2) clear the enforcing bit of each of the directories that are no longer in violation of its quota, (3) set the epoch of the directory or directories that are no longer in violation of the quota to "21"—the current epoch—, and (4) increment the system epoch counter to "22." Because the disclosed file system maintains aggregate metrics for individual directories, the facility need not necessarily traverse an entire file structure to determine the size of a directory.

In some embodiments, the facility notifies or alerts users when a quota is violated or is close to being violated. For example, the facility may send a message (e.g., email, SMS message, system message) to an end user or system administrator when the size of a filesystem object reaches a predetermined percentage of its quota (e.g., 33%, 50%, 75%, 90%, 95%). In some embodiments, individual quotas may have different notification percentages stored in, for example, metadata or an inode associated with a corresponding filesystem object. For example, "/usr1/dir1" may have a notification percentage of 80% while "/usr1" has a notification percentage of 95%. Furthermore, the notifications may occur during aggregate reconciliation. In some cases the notification may be transmitted over a wireless communication channel to a wireless device associated with a particular user or users (e.g., a system administrator, an owner of an account whose quota has been violated, etc.) based upon an address or addresses associated with the particular user or users. The notification may be used to activate a user application to cause the notification to display on a remote user computer system and to enable connection, via a link or other identifier in the notification, to the quota management facility over the Internet when the wireless device is connected (e.g., locally) to the remote user computer system and the remote user computer system comes online.

Additionally, in some embodiments the facility provides reports for any number of quotas in the quota management system, such as a percentage of the quota currently being used by the corresponding filesystem objects. In some cases, the facility aggregates quota values for directory, quota enforcement bits, and so on and store these aggregations in metadata or an inode for a directory. For example, an aggregated quota enforcement bit can be used to indicate whether any subdirectories of a given directory (the directory associated with the aggregated value) are enforcing their quota. As another example, an aggregated quota value may provide an indication of the subdirectory of the given directory with the highest percentage of its quota used, the unused percentage, the lowest net amount of unused quota space, and so on.

In some cases, the facility may employ quota templates, which establish default quota values for newly created filesystem objects subject to the quota template (e.g., newly created directories under a parent directory assigned to a particular quota template). For example, a user may establish a quota template for the root directory that specifies that any new subdirectory of the root directory will be created with a quota of a specified value (e.g., 1 GB, 5 GB, 100 GB, 1 TB, 50 TB, and so on); a specified percentage of the root directory's quota (e.g., 10%, 20%, 50%, and so on); a specified percentage of the root directory's unused quota; and so on. In some embodiments, the facility may track a count of the number of quotas that are currently being violated to further minimize processing. For example, if the count is currently 0 then the facility could bypass checking whether any quotas are currently violated.

The disclosed technology offers several benefits over other techniques for managing quotas in a shared storage system, such as a shared filesystem. In other quota management systems, the system must traverse a user's entire filesystem when changes are made to ensure that the user has not surpassed the user's quota. This traversal can take up valuable resources in the corresponding system, thereby delaying the execution of other operations in the filesystems. In some cases, other quota management systems "slow down" a user's ability to perform filesystem operations as the user approaches the user's quota to ensure that the quota management system has sufficient time to confirm that the user will not violate the user's quota if a particular operation is performed. For example, the quota management system may only allow a user to perform one write operation per traversal of the filesystem to ensure that the user has not (or will not) violate the user's quota. The installation and use of the disclosed quota management facility, in contrast, enables an organization or other party to create, manage, and enforce quotas within a storage system without necessarily requiring traversal of a user's portion of a storage system and without slowing down a user's access to the storage system, even as the user approaches the user's quota. Thus, the disclosed facility improves the ability of computers to maximize the usefulness of a shared storage system to users hile simultaneously managing quotas within the storage system.

FIG. 1 is a block diagram illustrating an environment in which the facility may operate in accordance with some embodiments of the disclosed technology. The environment 100 includes service provider 110, offsite storage providers 120, customers 130, users 140, and network 150. Service provider 110 provides the facility for analyzing and visualizing trends within a filesystem and is comprised of facility 111, which includes set quota component 112, modify component 113, spinewalk component 114, add component 115, remove component 116, checkquota component 117, and data store 118. Set quota component 112 is invoked by the component to set or remove a quota for a filesystem object. Modify component 113 is invoked by the facility to modify a filesystem object in accordance with the quota management techniques described herein. Spinewalk component 114 is invoked by the modify component to test whether any of the filesystem object in a path string are enforcing their respective quotas. Add component 115 is invoked by modify component 113 to add information to a file system subject to the quota management system described herein. Remove component 116 is invoked by modify component 113 to remove information to a file system subject to the quota management system described herein. Checkquota component 117 is invoked by a reconciliation component to update quota information for filesystem objects subject to the disclosed quota management system. In some embodiments, data store 118 may include additional stores, such as remote or distributed storage systems, and so on. Offsite storage providers 120 offer storage space for the filesystem and are comprised of data store 121. Accordingly, in various embodiments, the facility is configured to manage quotas for distributed and non-distributed filesystems. Customers 130 represent the filesystem accountholders and may include individuals, organizations, system administrators, and so on. These customers may have established relationships with the service provider 110 and/or offsite storage providers 120 and may interact with their corresponding filesystems directly or via network 150. Users 140 represent the users that interact with the filesystem, either directly or via network 150.

The computing devices on which the facility is implemented may include a central processing unit, memory, input devices (e.g., keyboard and pointing devices), output devices (e.g., display devices), and storage devices (e.g., disk drives), such as computer-readable storage media. Computer-readable storage media include, for example, tangible media such as hard drives, CD-ROMs, DVD-ROMS, and memories such as ROM, RAM, and Compact Flash memories that can store instructions and other storage media. The phrase "computer-readable storage medium" does not include propagating, transitory signals and should not be interpreted as propagating, transitory signals. In addition, the instructions, data structures, and message structures may be stored or transmitted via a data transmission medium, such as a signal on a communications link and may be encrypted. The term "data transmission medium" should not be interpreted as computer-readable storage media. Various communications links may be used, such as the Internet, a local area network, a wide area network, a point-to-point dial-up connection, a cell phone network, and so on and may be encrypted.

Embodiments of the facility may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The facility may be described in the general context of computer-executable instructions, such as program modules, executed by one or more computers or other devices. Further, such functions correspond to modules, which are software, hardware, firmware, or any combination thereof. Multiple functions can be performed in one or more modules as desired, and the embodiments described are merely examples. A digital signal processor, ASIC, microprocessor, or any other type of processor operating on a system, such as a personal computer, server computer, supercomputing system, router, or any other device capable of processing data including network interconnection devices executes the software. Those skilled in the art will appreciate that any logic illustrated in the Figures (e.g., flow diagrams), may be altered in a variety of ways. For example, the order of the logic may be rearranged, sublogic may be performed in parallel, illustrated logic may be omitted, other logic may be included, etc. Typically, the functionality of the program modules may be combined or distributed as desired in various embodiments.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
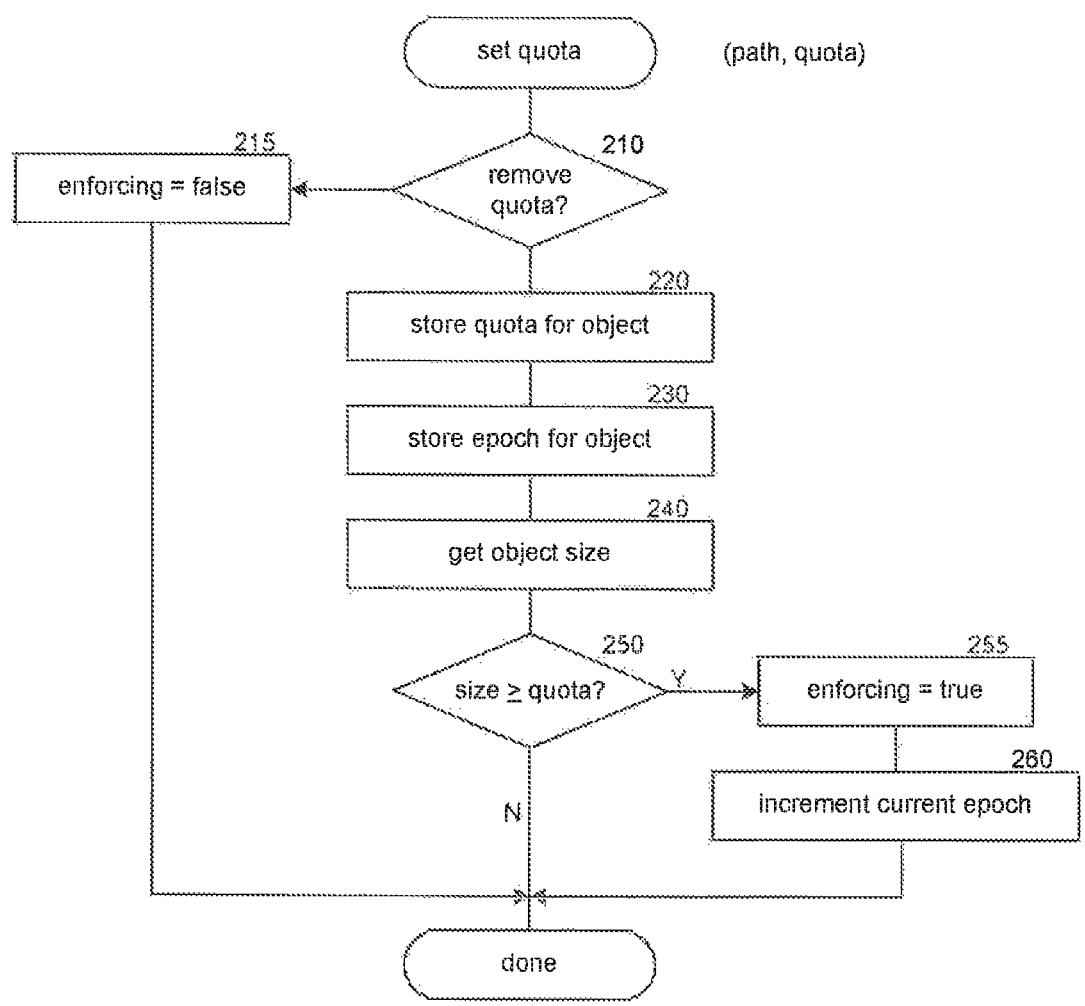
FIG. 2 is a flow diagram illustrating the processing of a set quota component.

FIG. 2 is a flow diagram illustrating the processing of a set quota component in accordance with some embodiments of the disclosed technology. The set quota component is invoked by the facility to set or remove a quota for an individual filesystem object. In this example, the component receives a "path" string to the filesystem object and a "quota" value to be assigned to the filesystem object. In some embodiments, the receipt of a special quota value such as a negative quota value or a separate flag may be used to indicate that the quota is to be removed. In decision block 210, if the quota is being removed then the component continues at block 215, else the component continues at block 220. In block 215, the component clears the enforcing bit for the corresponding filesystem object (i.e., the filesystem object corresponding to the retrieved path string) by, for example, clearing or setting the enforcing bit to false. In block 220, the component stores the received quota value in association with the filesystem object. For example, the component may store the quota value in a table referenced via the filesystem object, in an inode object associated with the filesystem object, and so on. In block 230, the component stores the current system epoch counter value in association with the filesystem object. For example, the component may store the current system epoch counter value in a table referenced via the filesystem object, in an inode object associated with the filesystem object, and so on. In block 240, the component retrieves the current size of the filesystem object. For example, if the filesystem object is a directory the component may retrieve the size of the filesystem object from an aggregate value of the filesystem object stored in metadata or an inode associated with the filesystem object. In decision block 250, if the retrieved size of the filesystem object is greater than or equal to the quota value then the component continues at block 255, else processing of the component completes. In block 255, the component sets the enforcing bit for the filesystem object by, for example, setting the enforcing bit to true. In block 260, the component increments the system epoch counter and then completes. In some embodiments, a means for setting a quota for a filesystem object comprises one or more computers or processors configured to carry out an algorithm disclosed in FIG. 2 and this paragraph in the order described therein.

Figure 3:
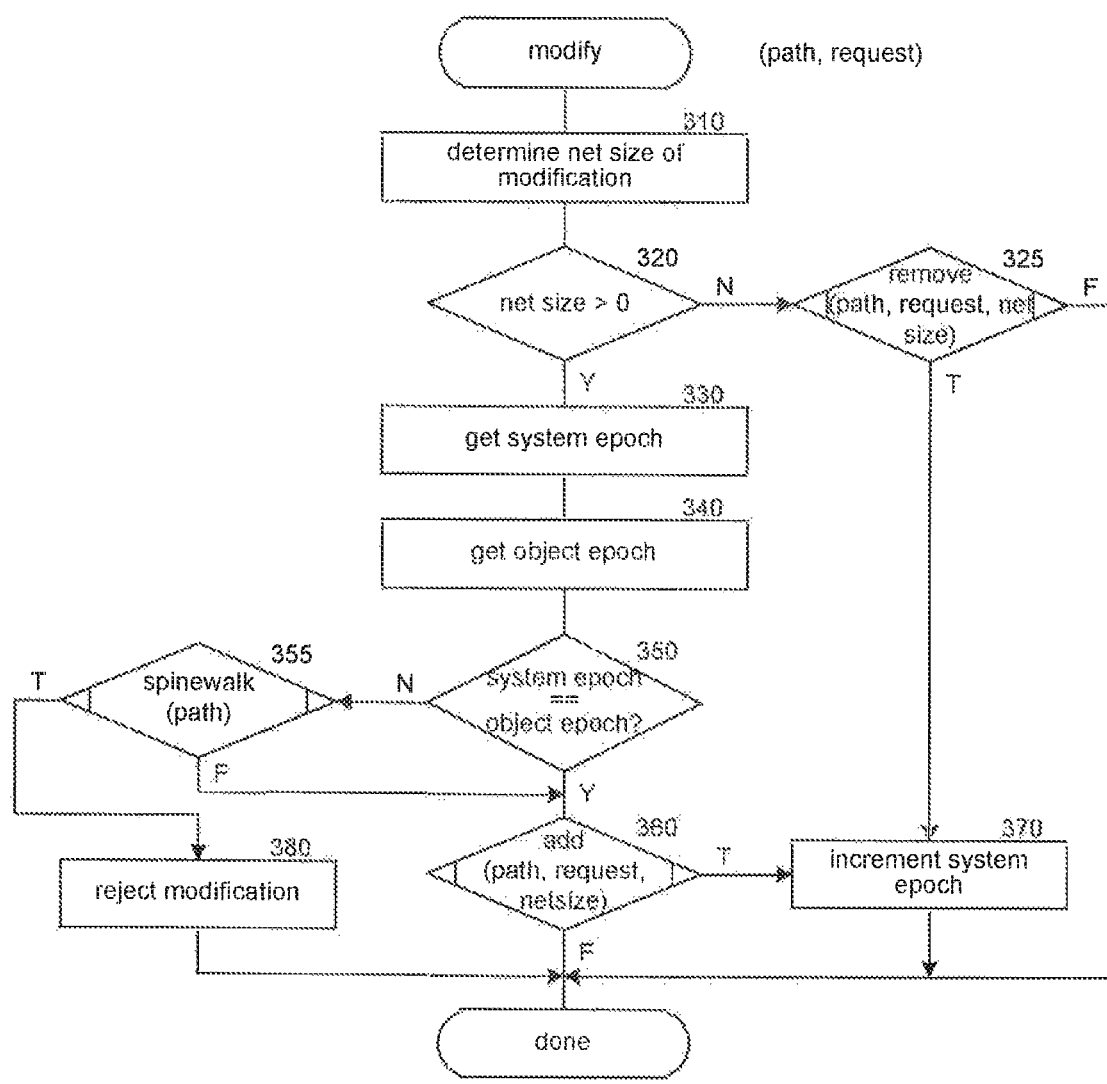
FIG. 3 is a flow diagram illustrating the processing of a modify component.

FIG. 3 is a flow diagram illustrating the processing of a modify component in accordance with some embodiments of the disclosed technology. The modify component is invoked by the facility in response to a request to modify (e.g., write or delete) a filesystem object in accordance with the quota management techniques described herein. In this example, the component receives a "path" string identifying the filesystem object to be modified. In block 310, the component determines the net size of the modification. For example, if the modification is to add 10 GB to a directory, then the net size of the modification is +10 GB; if the modification is to delete 5 GB from a directory, then the net size of the modification is −5 GB; if the modification is to replace 100 MB of data with 20 MB, then the net size of the modification is −80 MB. In decision block 320, if the determined net size is greater than 0 (i.e., if the modification would increase the size of the filesystem object), then the component continues at block 330, else the component continues at decision block 325. In decision block 325, the component invokes a remove component for the filesystem object. If the remove component returns a value of true, indicating that the invocation of the remove component created a new epoch, then the component continues at block 370, else the component completes. In block 330, the component retrieves the current system epoch counter. In block 340, the component retrieves the object epoch for the filesystem object. For example, the component may access an inode or metadata associated with the filesystem object to retrieve the object epoch for the filesystem object. In block 350, if the current system epoch counter is equal to the retrieved object epoch, the component continues at decision block 360, else the component continues at decision block 355. In decision block 355, the component invokes a spinewalk component for the filesystem object to determine whether any filesystem objects in the path of the filesystem object have already violated their quotas. If the spinewalk component returns a value of true, indicating that at least one quota of the filesystem objects is being enforced, then the component continues at block 380, else the component continues at decision block 360. In block 380 the component rejects the request to modify the filesystem object and then completes. In decision block 360, the component invokes an add component for the filesystem object. If the add component returns a value of true, indicating that the invocation of the add component created a new epoch, then the component continues at block 370, else the component completes. In block 370, the component increments the system epoch and then completes. In some embodiments, a means for performing a modification of a filesystem object comprises one or more computers or processors configured to carry out an algorithm disclosed in FIG. 3 and this paragraph, in some cases in the order described therein.

Figure 4:
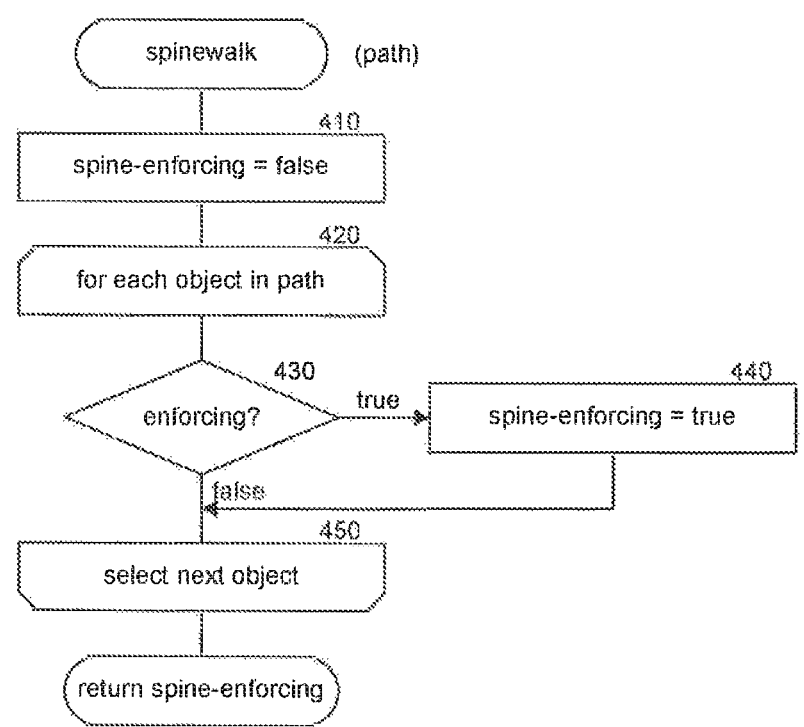
FIG. 4 is a flow diagram illustrating the processing of a spinewalk component.

FIG. 4 is a flow diagram illustrating the processing of a spinewalk component in accordance with some embodiments of the disclosed technology. The spinewalk component is invoked by the modify component to test whether any of the filesystem objects in a path string are subject to a quota that is currently being enforced. In this example, the component receives a "path" string to the filesystem object. In block 410, the component initializes a spine-enforcing variable to false. The spine-enforcing variable is used to determine whether any filesystem objects in the path are currently enforcing its associated quota. In blocks 420-450, the component loops through each of the filesystem objects in the received path, starting with the highest filesystem object (e.g., at the root directory) to determine whether it is subject to any quota that is currently being violated (i.e., that is currently being enforced). In decision block 430, if the currently-selected filesystem object is enforcing, then the component continues at block 440, else the component continues at block 450. In block 440, the component sets the spine-enforcing variable to true and then continues at block 450. In block 450, the component selects the next filesystem object of the path, if there are any remaining, and then loops back to block 420 to test the next filesystem object. If there are no filesystem objects of the path left to be processed then the component returns the spine-enforcing variable. For example, if the component received the path "/usr1/dir1/dir2/file1," the component would check each of the file filesystem objects represented by the path (i.e., "/" (the root directory), "/usr1/," "/usr1/dir1/," "/usr1/dir1/dir2/," and "/usr1/dir1/dir2/file1,") to determine whether any of these filesystem objects are currently in violation of a quota. In some embodiments, a means for performing a spinewalk of a filesystem object comprises one or more computers or processors configured to carry out an algorithm disclosed in FIG. 4 and this paragraph in the order described therein.

Figure 5:
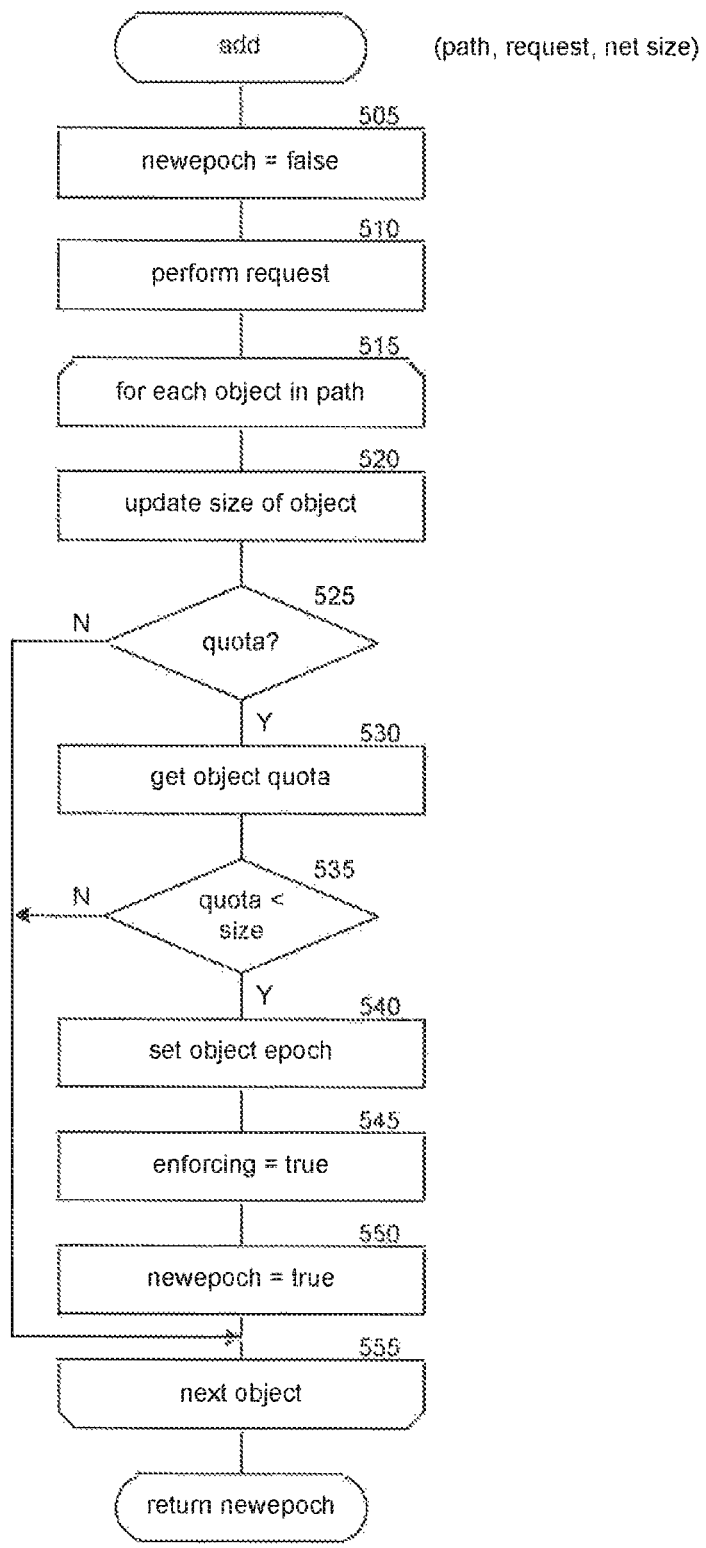
FIG. 5 is a flow diagram illustrating the processing of an add component.

FIG. 5 is a flow diagram illustrating the processing of an add component in accordance with some embodiments of the disclosed technology. The add component is invoked by a modify component to add information to a filesystem subject to the quota management system described herein in response to a request to modify a filesystem object. In this example, the component receives a "path" string to the filesystem object, a "net size" value corresponding to the net size of the information to be added to the filesystem, and an indication of the requested modification. In block 505, the component initializes a newepoch variable to false. In block 510, the component performs the modification request (e.g., performs the requested write or writes to the filesystem object). In blocks 515-555, the component loops through each filesystem object in the path to update size information for the selected filesystem object and to determine whether the modification will cause the selected filesystem object to violate its quota. In block 515, the component selects the next filesystem object in the path, starting with the filesystem object that is the target of the modification request (i.e., the filesystem object identified by the received path string). In block 520, the component updates the size of the currently-selected filesystem object based on, for example, the net size of the requested modification. For example, if the currently-selected filesystem object is a directory, then the component updates an aggregate size of the currently-selected filesystem object by adding the netsize value to the current aggregate value. In some cases, the component may skip block 520 if, for example, the filesystem object is a file with no aggregated values. In decision block 525, if the currently-selected filesystem object has its own quota, then the component continues at block 530, else the component continues at block 555. In block 530, the component retrieves the quota for the currently-selected filesystem object. In decision block 535, if the retrieved quota is less than the updated size of the currently-selected filesystem object (i.e., if the modification caused the currently-selected filesystem object to violate its quota), then the component continues at block 540, else the component continues at block 555. In block 540, the component sets the object epoch of the currently-selected filesystem object to the current system epoch counter value. In block 545, the component sets the enforcing bit for the currently-selected filesystem object to true. In block 550, the component sets the newepoch variable to true. In block 555, the component selects the next filesystem object in the path, if there are any remaining, and then loops back to block 515 to update size information for the next filesystem object and to determine whether the modification has caused it to violate its quota. If no filesystem objects in the path are left to be processed, then the component returns the newepoch variable. In some embodiments, a means for increasing the size of a filesystem object in accordance with the quota management system comprises one or more computers or processors configured to carry out an algorithm disclosed in FIG. 5 and this paragraph in the order described therein.

Figure 6:
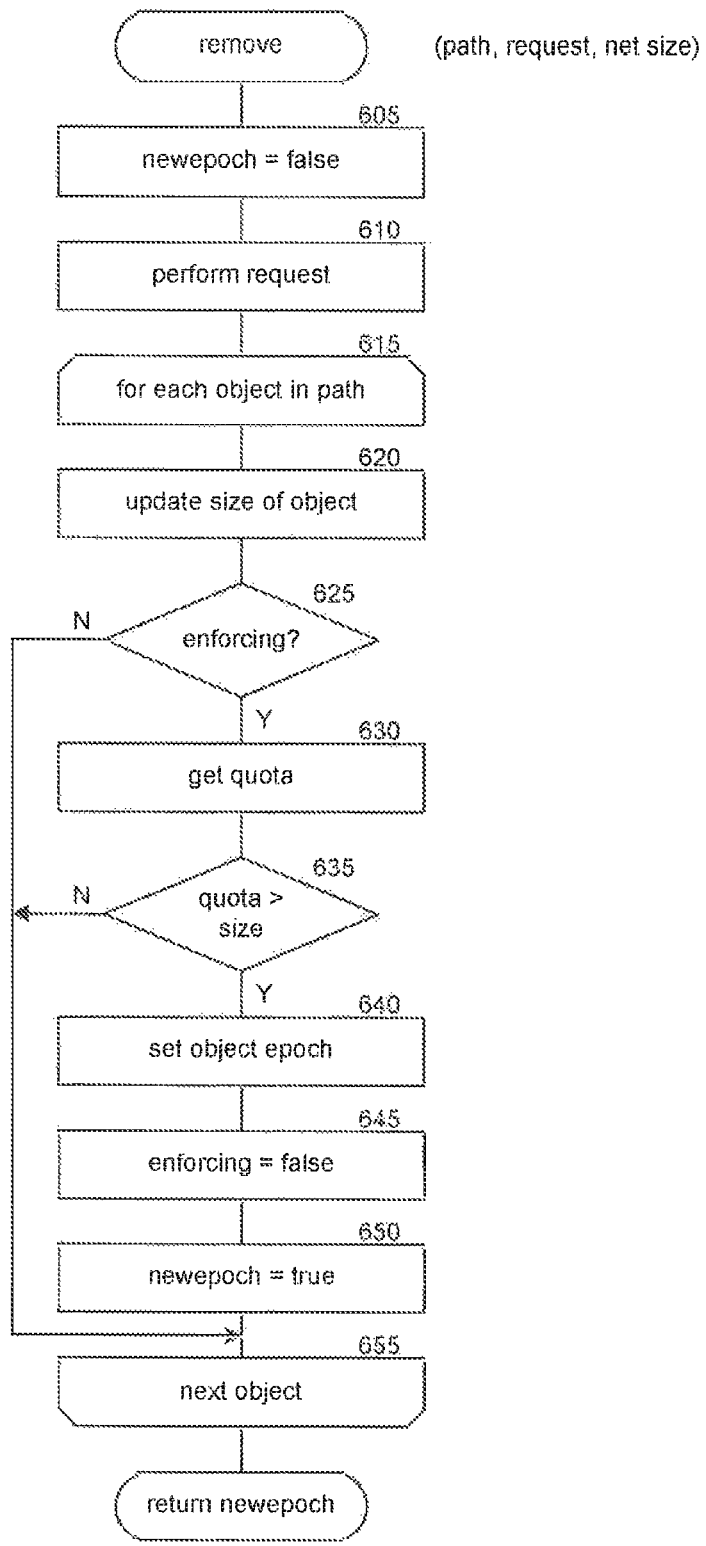
FIG. 6 is a flow diagram illustrating the processing of an add component.

FIG. 6 is a flow diagram illustrating the processing of a remove component in accordance with some embodiments of the disclosed technology. The remove component is invoked by a modify component to remove (or maintain the size of) information from a filesystem subject to the quota management system described herein in response to a request to modify a filesystem object. In this example, the component receives a "path" string to the filesystem object, a "net size" value corresponding to the net size of the information to be added to the filesystem, and an indication of the requested modification. In block 605, the component initializes a newepoch variable to false. In block 610, the component performs the modification request (e.g., performs the requested write or writes to the filesystem object). In blocks 615-655, the component loops through each filesystem object in the path to update size information for the selected filesystem object and to determine whether the modification will cause a filesystem object that is currently enforcing (i.e., that is current in violation of its quota) to come into compliance with the quota (i.e., drop under its quota). In block 615, the component selects the next filesystem object in the path, starting with the filesystem object that is the target of the modification request (i.e., the filesystem object identified by the received path string). In block 620, the component updates the size of the currently-selected filesystem object based on, for example, the net size of the requested modification. For example, if the currently-selected filesystem object is a directory, then the component updates an aggregate size of the currently-selected filesystem object by adding the received netsize value to the current aggregate value of the currently-selected filesystem object. In decision block 625, if the currently-selected filesystem object is currently enforcing (e.g., has an enforcing bit equal to true), then the component continues at block 630, else the component continues at block 655. In block 630, the component retrieves the quota for the currently-selected filesystem object. In decision block 635, if the retrieved quota is greater than the updated size of the currently-selected filesystem object (i.e., if the modification caused the currently-selected filesystem object to come into compliance with its quota), then the component continues at block 640, else the component continues at block 655. In block 640, the component sets the object epoch of the currently-selected filesystem object to the current system epoch counter value. In block 645, the component clears the enforcing bit for the currently-selected filesystem object (i.e., sets the enforcing bit to false). In block 650, the component sets the newepoch variable to true. In block 655, the component selects the next filesystem object in the path, if there are any remaining, and then loops back to block 615 to update size information for the next filesystem object and to determine whether the modification has caused it to come into compliance with its quota (if it is currently enforcing). If no filesystem objects in the path are left to be processed, then the component returns the newepoch variable. In some embodiments, a means for decreasing the size of a filesystem object in accordance with the quota management system comprises one or more computers or processors configured to carry out an algorithm disclosed in FIG. 6 and this paragraph in the order described therein.

Figure 7:
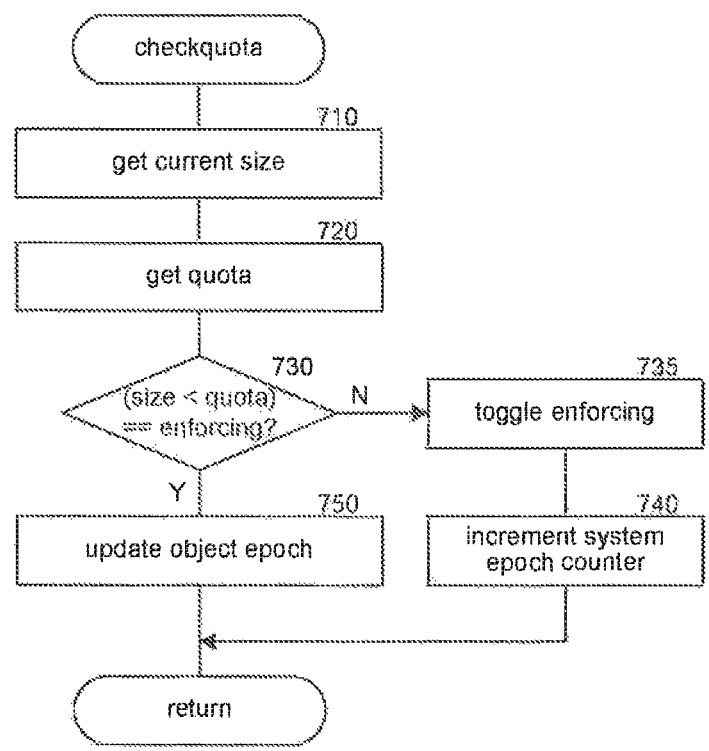
FIG. 7 is a flow diagram illustrating the processing of a checkquota component.

FIG. 7 is a flow diagram illustrating the processing of a checkquota component in accordance with some embodiments of the disclosed technology. The checkquota component is invoked by a reconciliation component of the filesystem during aggregate reconciliation for filesystem objects that have a quota. The component updates quota information for filesystem objects subject to the disclosed quota management system. In block 710, the component retrieves the current size of the filesystem object. In block 720, the component retrieves the quota for the filesystem object. In decision block 730, if the boolean value (current size>quota) is equal to the enforcing bit for the filesystem object, then the component continues at block 735, else the component continues at block 750. In block 735, the component toggles the enforcing bit (i.e., if the enforcing bit is set the component clears it and if the enforcing bit is cleared it sets it). In block 740, the component increments the system epoch counter. In block 750, the component updates the filesystem object epoch value to the current system epoch counter value. In some embodiments, a means for performing quota reconciliation comprises one or more computers or processors configured to carry out an algorithm disclosed in FIG. 7 and this paragraph in the order described therein.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for managing a file system in a shared storage system over a network, wherein instructions are executed by one or more processors to perform actions of the method, comprising:

providing access to a plurality of file system objects that are associated with one or more directories or files in a file system stored on one or more of a plurality of storage devices;

maintaining aggregate metrics for individual directories of the file system that are stored in one of metadata and an inode for each directory, wherein the aggregated metrics are used to determine a size of each directory without traversing all of the file objects in the file system; and in response to a request to modify a first file system object, performing actions, including:

comparing a current epoch value to another epoch value previously associated with the first file system object, wherein the comparison and the aggregated metrics are used to determine when one or more file system objects are current with a quota without having to traverse the entire file system;

employing a result of the comparison that is equal to enable one or more modifications for an increase or a decrease to a size of the first file system object; and employing the result of the comparison being unequal to disallow the one or more modifications to the size of the first file object when the first file system object and one or more parent objects are being used for enforcing the quota current for the one or more file system objects.

2. The method of claim 1, wherein employing the result further comprises:

in response to the result including an equal comparison, allowing an increase or a decrease in the size of the first file system object; and in response to the result including the unequal comparison and the one of the first file system objects or the one or more parent objects of the first file system object non-enforcing the quota, allowing the one or more modification to the size of the first file object.

3. The method of claim 1, further comprising:

providing a quota enforcement status for each file system object that is directly or indirectly subject to the quota, wherein setting of a value for the quota enforcement status for a directory automatically sets the same value for the quota enforcement status for each descendent file system object.

4. The method of claim 1, wherein the modification further comprises:

determining if one or more file system objects in a path string are subject to the quota that is being enforced.

5. The method of claim 1, further comprising:

enabling a request to add information to one or more filesystem objects that is non-enforcing the quota if an epoch associated with the one or more filesystem objects is different from a current epoch.

6. The method of claim 1, further comprising maintaining epoch values for individual filesystem objects.

7. The method of claim 1, further comprising:

determining a percentage of the plurality of filesystem objects currently enforcing the quota; and providing a report of the percentage when a threshold percentage is reached.

8. A computer for managing a file system in a shared storage system over a network, comprising:

a memory for storing instructions; and one or more processors that execute the instructions to perform actions, including:

providing access to a plurality of file system objects that are associated with one or more directories or files in a file system stored on one or more of a plurality of storage devices; and maintaining aggregate metrics for individual directories of the file system that are stored in one of metadata and an inode for each directory, wherein the aggregated metrics are used to determine a size of each directory without traversing all of the file objects in the file system; and in response to a request to modify a first file system object, performing actions, including:

comparing a current epoch value to another epoch value previously associated with the first file system object, wherein the comparison and the aggregated metrics are used to determine when one or more file system objects are current with a quota without having to traverse the entire file system;

employing a result of the comparison that is equal to enable one or more modifications for an increase or a decrease to a size of the first file system object; and employing the result of the comparison being unequal to disallow the one or more modifications to the size of the first file object when the first file system object and one or more parent objects are being used for enforcing the quota current for the one or more file system objects.

9. The computer of claim 8, wherein employing the result further comprises:

in response to the result including an equal comparison, allowing an increase or a decrease in the size of the first file system object; and in response to the result including the unequal comparison and the one of the first file system objects or the one or more parent objects of the first file system object non-enforcing the quota, allowing the one or more modification to the size of the first file object.

10. The computer of claim 8, further comprising:

providing a quota enforcement status for each file system object that is directly or indirectly subject to the quota, wherein setting of a value for the quota enforcement status for a directory automatically sets the same value for the quota enforcement status for each descendent file system object.

11. The computer of claim 8, wherein the modification further comprises:

determining if one or more file system objects in a path string are subject to the quota that is being enforced.

12. The computer of claim 8, further comprising:

enabling a request to add information to one or more filesystem objects that is non-enforcing the quota if an epoch associated with the one or more filesystem objects is different from a current epoch.

13. The computer of claim 8, further comprising maintaining epoch values for individual filesystem objects.

14. The computer of claim 8, further comprising:

determining a percentage of the plurality of filesystem objects currently enforcing the quota; and providing a report of the percentage when a threshold percentage is reached.

15. A processor readable non-transitive storage media that includes instructions for managing a file system in a shared storage system over a network, wherein execution of the instructions by one or more processors performs actions, comprising:

providing access to a plurality of file system objects that are associated with one or more directories or files in a file system stored on one or more of a plurality of storage devices; and maintaining aggregate metrics for individual directories of the file system that are stored in one of metadata and an inode for each directory, wherein the aggregated metrics are used to determine a size of each directory without traversing all of the file objects in the file system; and in response to a request to modify a first file system object, performing actions, including:

comparing a current epoch value to another epoch value previously associated with the first file system object, wherein the comparison and the aggregated metrics are used to determine when one or more file system objects are current with a quota without having to traverse the entire file system;

employing a result of the comparison that is equal to enable one or more modifications for an increase or a decrease to a size of the first file system object; and employing the result of the comparison being unequal to disallow the one or more modifications to the size of the first file object when the first file system object and one or more parent objects are being used for enforcing the quota current for the one or more file system objects.

16. The media of claim 15, wherein employing the result further comprises:

in response to the result including an equal comparison, allowing an increase or a decrease in the size of the first file system object; and in response to the result including the unequal comparison and the one of the first file system objects or the one or more parent objects of the first file system object non-enforcing the quota, allowing the one or more modification to the size of the first file object.

17. The media of claim 15, further comprising:

providing a quota enforcement status for each file system object that is directly or indirectly subject to the quota, wherein setting of a value for the quota enforcement status for a directory automatically sets the same value for the quota enforcement status for each descendent file system object.

18. The media of claim 15, wherein the modification further comprises:

determining if one or more file system objects in a path string are subject to the quota that is being enforced.

19. The media of claim 15, further comprising:

enabling a request to add information to one or more filesystem objects that is non-enforcing the quota if an epoch associated with the one or more filesystem objects is different from a current epoch.

20. The media of claim 15, further comprising:

determining a percentage of the plurality of filesystem objects currently enforcing the quota; and providing a report of the percentage when a threshold percentage is reached.

* * * * *